US007740113B2

(12) United States Patent
Ach

(10) Patent No.: US 7,740,113 B2
(45) Date of Patent: Jun. 22, 2010

(54) BELT END CONNECTION FOR AN ELEVATOR INSTALLATION

(75) Inventor: Ernst Ach, Ebikon (CH)

(73) Assignee: Inventio AG, Hergiswil NW (CH)

( * ) Notice: Subject to any disclaimer, the term of this patent is extended or adjusted under 35 U.S.C. 154(b) by 0 days.

(21) Appl. No.: 12/260,309

(22) Filed: Oct. 29, 2008

(65) Prior Publication Data

US 2009/0127032 A1 May 21, 2009

Related U.S. Application Data

(63) Continuation of application No. 11/216,400, filed on Aug. 31, 2005, now Pat. No. 7,469,774.

(30) Foreign Application Priority Data

Sep. 13, 2004 (EP) ................................. 04021670

(51) Int. Cl.
*B66B 7/08* (2006.01)
*F16G 11/04* (2006.01)
*F16G 11/10* (2006.01)

(52) U.S. Cl. .................. 187/411; 24/115 M; 24/136 K; 403/211

(58) Field of Classification Search ................. 187/411; 24/130, 115 M, 136 K, 136 L, 136 R; 403/211
See application file for complete search history.

(56) References Cited

U.S. PATENT DOCUMENTS

| | | | | |
|---|---|---|---|---|
| 2,234,028 | A * | 3/1941 | Turzicky | 403/19 |
| 2,827,680 | A * | 3/1958 | Gibson | 403/211 |
| 3,666,051 | A | 5/1972 | Davis et al. | |
| 4,724,929 | A | 2/1988 | Coleman et al. | |
| 5,199,137 | A | 4/1993 | Edwards | |
| 5,353,893 | A | 10/1994 | Sun et al. | |
| 5,553,360 | A | 9/1996 | Lucas et al. | |
| 6,234,276 | B1 | 5/2001 | Wagatsuma et al. | |
| 6,357,085 | B2 | 3/2002 | Ericson et al. | |
| 2001/0014996 | A1* | 8/2001 | Ericson et al. | 24/136 R |
| 2002/0154944 | A1* | 10/2002 | Traktovenko et al. | 403/347 |
| 2003/0041419 | A1 | 3/2003 | Perez et al. | |
| 2007/0034454 | A1* | 2/2007 | Dold et al. | 187/411 |

FOREIGN PATENT DOCUMENTS

| | | | |
|---|---|---|---|
| EP | 1 252 086 | B1 | 3/2004 |
| JP | 4-016478 | A | 1/1992 |
| JP | 4-125282 | A | 4/1992 |
| JP | 7-172733 | A | 7/1995 |
| WO | WO 2004/069715 | A1 | 8/2004 |

* cited by examiner

*Primary Examiner*—John Q Nguyen
*Assistant Examiner*—Stefan Kruer
(74) *Attorney, Agent, or Firm*—Fraser Clemens Martin & Miller LLC; William J. Clemens

(57) ABSTRACT

A belt end connection for fastening a support belt end in an elevator installation and a method for protecting and checking a belt end connection in an elevator installation includes a twisting prevention device that prevents twisting of the belt end connection about the longitudinal axis thereof. A wedge retains the support belt end in a wedge pocket and is secured by a loss prevention device against slipping out of the wedge pocket. The twisting prevention device and/or the loss prevention enable efficient protection of the support belt and/or of the belt end connection against damage and make possible efficient checking and control of the belt end connection.

6 Claims, 4 Drawing Sheets

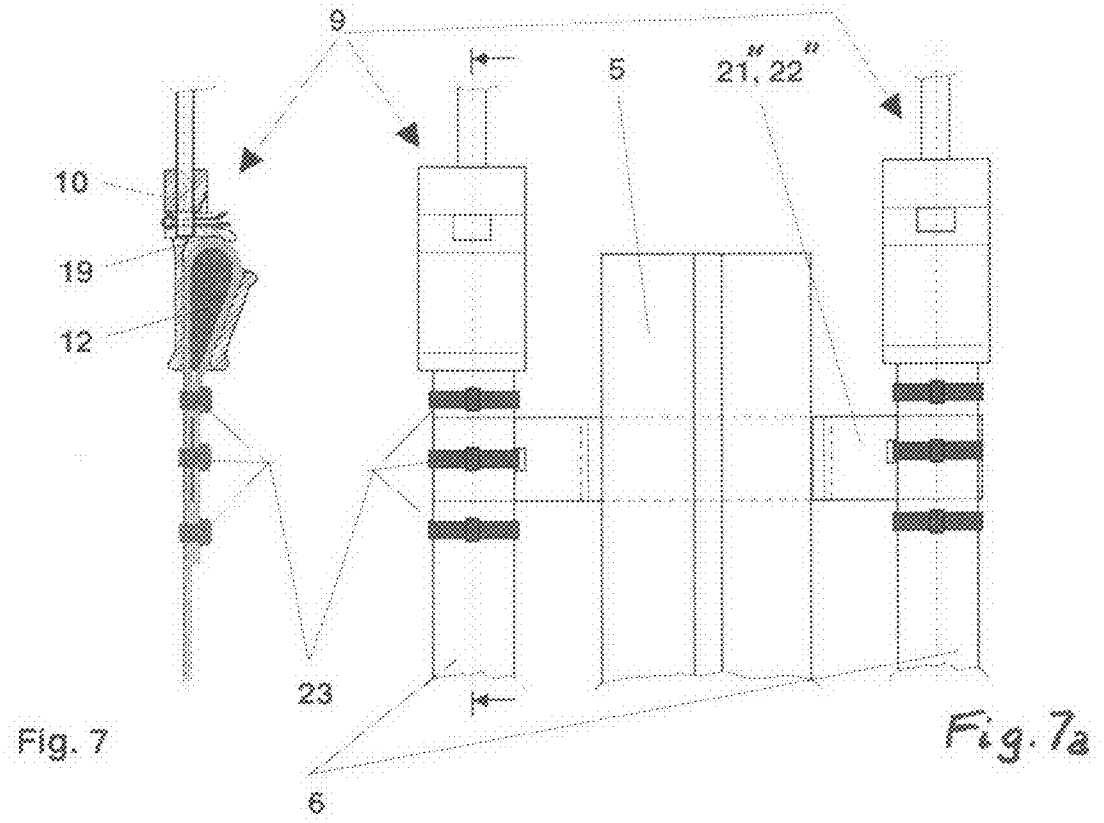
Fig. 7
Fig. 7a
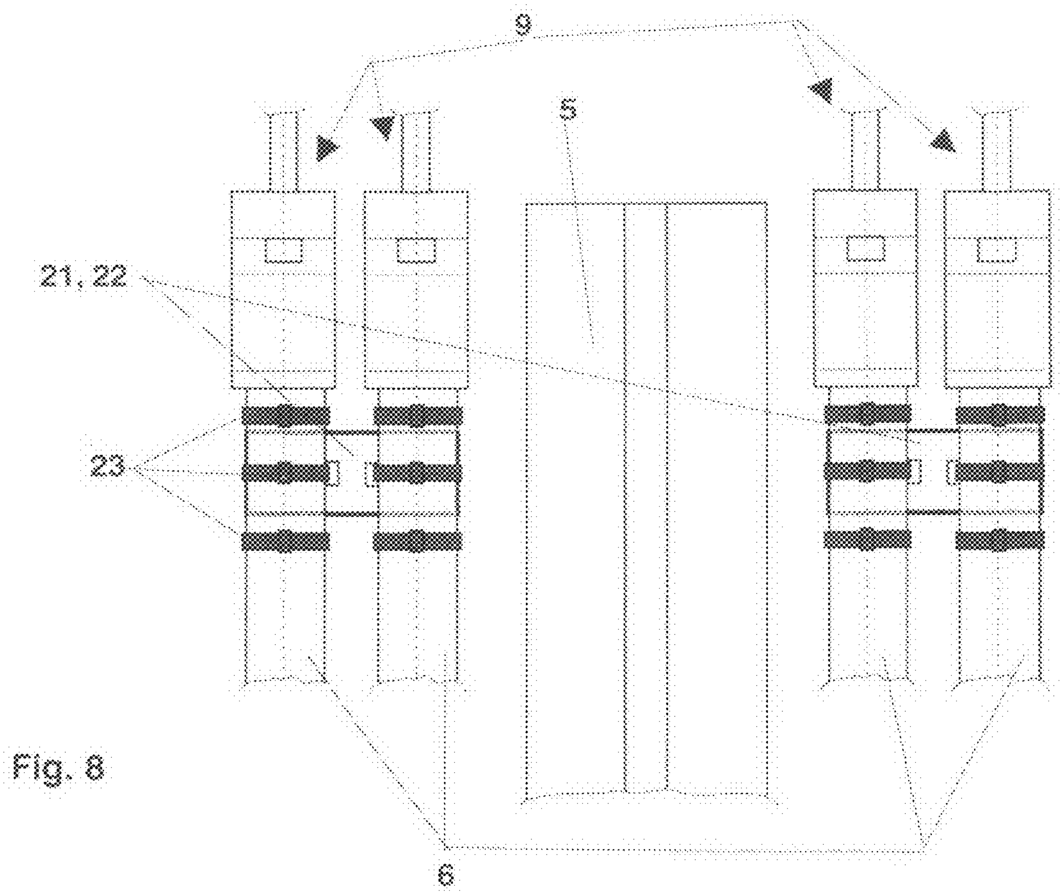
Fig. 8

BELT END CONNECTION FOR AN ELEVATOR INSTALLATION

CROSS-REFERENCE TO RELATED APPLICATION

This application is a continuation of the co-pending U.S. patent application Ser. No. 11/216,400 filed Aug. 31, 2005.

BACKGROUND OF THE INVENTION

The present invention relates to a belt end connection for fastening a belt end in an elevator installation and to a method for protecting and checking a belt end connection in an elevator installation.

An elevator installation usually consists of a car and a counterweight, which are moved in opposite sense in an elevator shaft. The car and the counterweight are connected together and supported by means of support belts. One end of the support belt in that case is fastened by a belt end connection to the car or counterweight or in the elevator shaft. The location of the fastening is oriented to the form of construction of the elevator installation. The belt end connection accordingly has to transfer the force, which acts in the support belt, to the car or to the counterweight or to the elevator shaft. It thus has to be designed in such a manner that it can securely transfer the allowable load-bearing force of the belt. The direction of mounting of the belt end connection is oriented to the location of the fastening. If the belt end connection is mounted at the car or the counterweight a direction of tension of the support belt is usually oriented upwardly, but in the case of mounting of the belt end connection in the elevator shaft the direction of tension of the support belt is usually oriented downwardly.

In known constructions the support belt is usually fixed in a wedge pocket by means of a wedge. A first wedge pocket surface is in that case constructed in correspondence with the direction of tension of the support belt. This first wedge pocket surface is arranged in the direction of withdrawal of the support belt. A second bridge pocket surface is constructed to be displaced relative to the first wedge pocket surface in correspondence with a wedge angle of the wedge. The support belt is now arranged between the two wedge pocket surfaces and the wedge and it draws the belt, by virtue of the friction conditions, into the wedge pocket, whereby the support belt is fixedly clamped.

A belt end connection of that kind is shown in European Patent EP 1252086. A disadvantage of this construction is that the belt end connections are susceptible to damage, particularly since the wedge can, for example in the case of belt slack, slip out of the wedge pocket, whereby the support belt can be damaged or the belt end connection can be twisted, whereby higher levels of support belt loading result. Support belt damage and/or higher levels of loading can lead to failure of the support belt or to reduced serviceability of the elevator installation. Belt slack can result if, for example, the car or the counterweight is braked strongly or is braked to a stop, which can take place, for example, in the case of a test of safety brakes or in the case of travel of car or counterweight onto travel limiting devices. Twisting of the belt end connection can take place if the support belt experiences a twisting moment as a consequence of, for example, production tolerances of the support belt itself or as a consequence of arrangements of fastening and deflecting points. This torque causes twisting about a longitudinal axis of the belt end connection. The longitudinal axis corresponds with an effective direction of the support force acting in the support belt.

SUMMARY OF THE INVENTION

An object of the present invention is accordingly to provide a belt end connection which is less susceptible to damage. Moreover, the belt end connection shall be favorable in costs, handling thereof in assembly and in maintenance shall be as simple as possible and it shall promote a high level of serviceability of the elevator installation.

The present invention relates to a belt end connection for fastening a belt end in an elevator installation and to a method of protecting and checking a belt end connection in an elevator installation.

The elevator installation consists of a car and a counterweight, which are moved in opposite sense in an elevator shaft. The car and the counterweight are connected together and supported by means of support belts. One end of the support belt is fastened by a belt end connection to the car or the counterweight or in the elevator shaft. The location of the fastening is oriented towards the mode of construction of the elevator installation. The support belt is retained in the belt end connection by means of a wedge, which fixes the support means in a wedge pocket.

According to a first part of the present invention there is provided twisting prevention means which prevents twisting of the belt end connection about the longitudinal axis thereof. The longitudinal axis in that case corresponds with the direction defined by the effective direction of the supporting force in the support belt.

An advantage of the present invention resides in the fact that the susceptibility of the belt end connection to damage is reduced, since the support belt is not twisted even when the support belt is slack. The twisting prevention means can be provided economically and can be mounted in simple manner.

This solution represents an effective method for being able to protect the belt end fastening and the associated support belt against damage. In addition, the twisting prevention means enables efficient checking of correct installation of the belt end fastening and it thus simplifies checking of the belt end fastening within the scope of maintenance of the elevator installation.

According to a second part of the present invention the wedge which fixes the support belt in the wedge pocket of the belt end connection is secured by way of loss prevention means against slipping out of the wedge pocket.

Another advantage of the present invention resides in the fact that the susceptibility of the belt end connection to damage is reduced, since the wedge cannot slip out of the wedge pocket and no damage of the support belt as a consequence of a loose wedge thereby results. The solution is economic and it can be quickly mounted without requiring special tools.

This solution represents an effective method of being able to protect the belt end fastening and the associated support belt against damage. In addition, the loss prevention means enables sufficient checking and control of correct installation of the belt end fastening.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 7 shows the belt end fastening of FIG. 4 in cross section;

FIG. 7*a* is a side elevation view of two of the belt end fastening of FIG. 4 are connected with a twisting prevention means to form a further belt end fastening, in the case of two support belts; and FIG. 8 is a view similar to FIG. 7*a* wherein four of the belt end fastenings are connected with a twisting prevention means to form a further belt end fastening, in the case of four support belts.

DESCRIPTION OF THE PREFERRED EMBODIMENT

Figure 1:
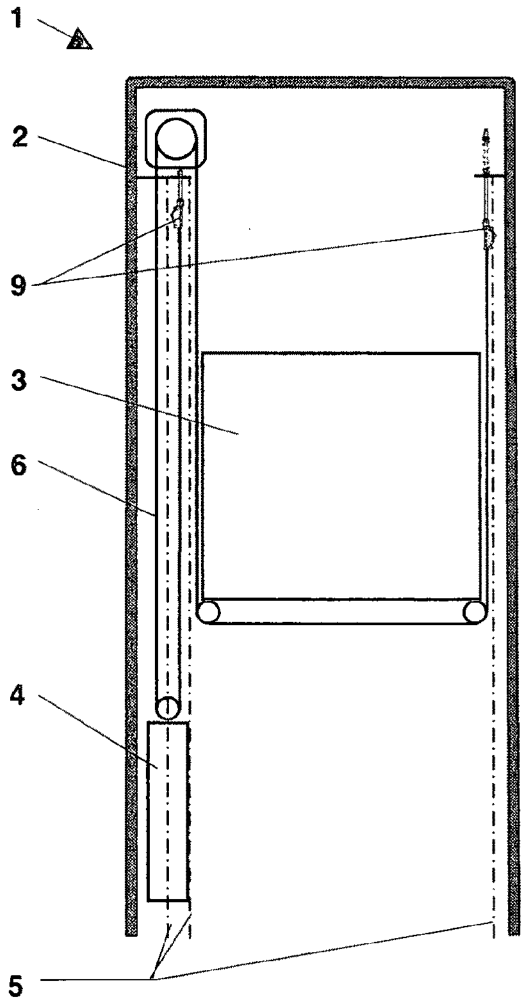
FIG. 1 is a schematic elevation view of an elevator installation, with underslinging, including belt end fastenings according to the present invention fastened in the elevator shaft.
Figure 2:
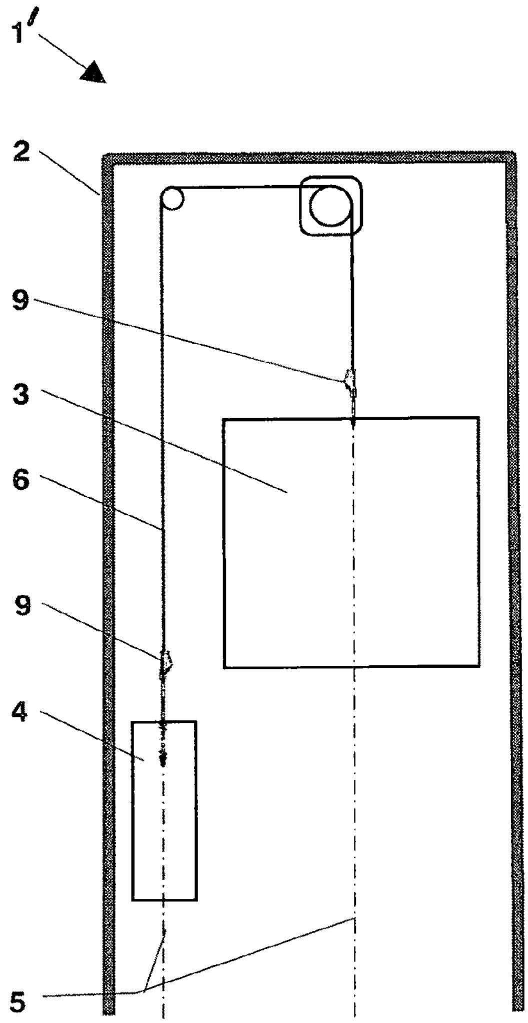
FIG. 2 is a schematic elevation view of a directly suspended elevator installation with the belt end fastenings according to the present invention fastened to an elevator car and a counterweight.
Figure 4:
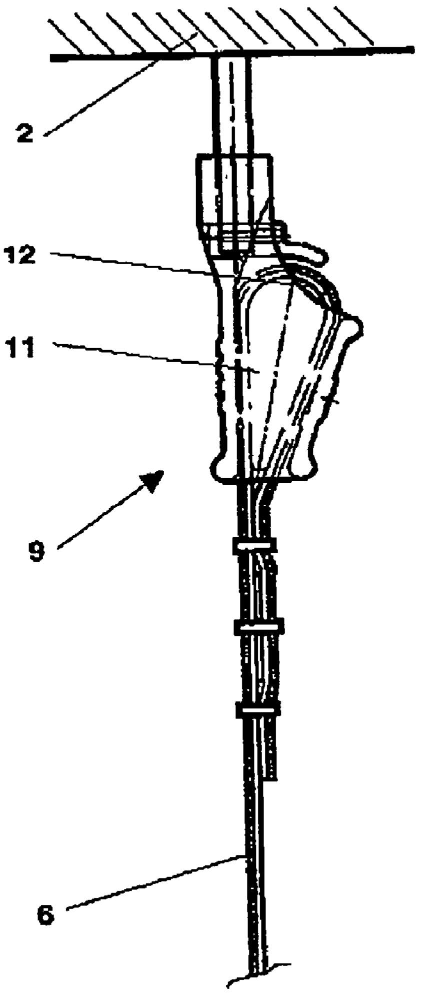
FIG. 4 is an enlarged view of the belt fastening shown in FIG. 1, which is fastened to the elevator shaft, with a downwardly acting support belt force.
Figure 3:
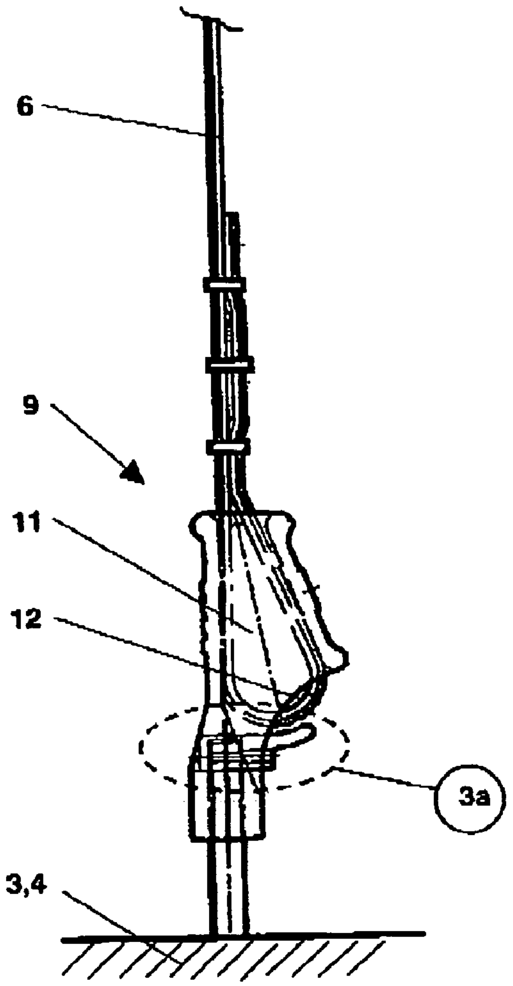
FIG. 3 is an enlarged view of the belt fastening shown in FIG. 2, which is fastened to the car or the counterweight, with an upwardly acting support belt force.

An elevator installation 1 and 1' includes, as illustrated in FIGS. 1 and 2 respectively, of a car 3 and a counterweight 4, which are moved in opposite sense in an elevator shaft 2. The car 3 and the counterweight 4 are connected together and supported by means of support belts 6. One end of the support belt 6 is fastened by a belt end connection 9 to the car 3 or counterweight 4, according to FIG. 2, or in the elevator shaft 2, according to FIG. 1. The location of the fastening is oriented according to the mode of construction of the elevator installation 1, 1'. In FIGS. 3 and 4 it is apparent how the support belt 6 is retained in the belt end connection 9 by means of a wedge 12, which fixes the support belt in a wedge pocket 11. The belt end fastening 9 is connected with the car 3 or the counterweight 4 or the elevator shaft 2.

Figure 5:
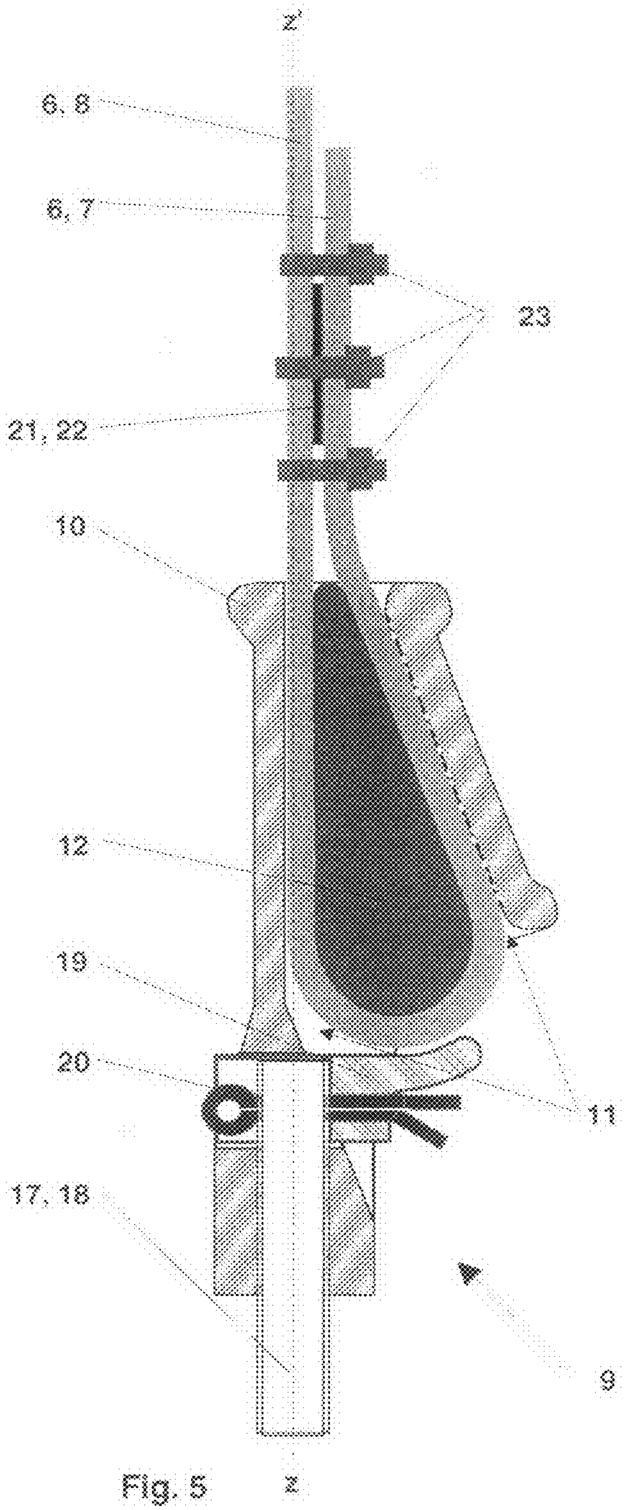
FIG. 5 is an enlarged cross-sectional elevation view of the belt end fastening shown in FIG. 3.

According to the present invention, as illustrated in FIG. 5, a twisting prevention means 21 is used for securing of the belt end connection 9 against twisting. The twisting prevention device or means 21 prevents twisting of the belt end connection 9 and of the support belt 6 about a longitudinal axis z-z' thereof. The longitudinal axis z-z' corresponds with the effective direction of the support force in the support belt 6.

Twisting of the belt end connection 9 and the associated support belt 6 is effectively prevented by a twisting prevention means 21. An unequal loading of the support belt 6 or damage to the support belt 6 is effectively precluded. The twisting prevention means 21 is economic and it can be mounted in a simple manner. It enables efficient checking of the state of the belt end connection 9 and thus improves the serviceability thereof.

In an advantageous embodiment the twisting prevention means 21 is a flat profile member 22, as illustrated by way of example in FIGS. 5, 7*a* and 8. The flat profile member 22 is, for example, a steel sheet metal strip. The flat profile member 22 is arranged, in the illustrated example, in the vicinity of the belt end connection 9, in area contact with the support belt 6.

The advantage of this embodiment is the particularly economic production of the twisting prevention means 21 and the entire belt end connection 9. Parts of simple design can be used, which do not require specific production knowledge.

As apparent in FIG. 5, the twisting prevention means 21 is fastened between a load-bearing run 8 of the support belt 6 and an idle run 7 of the support belt 6. This embodiment is advantageous, since prevention against twisting is achieved merely by a simply shaped twisting prevention means 21. This is advantageous with regard to costs.

Figure 6:
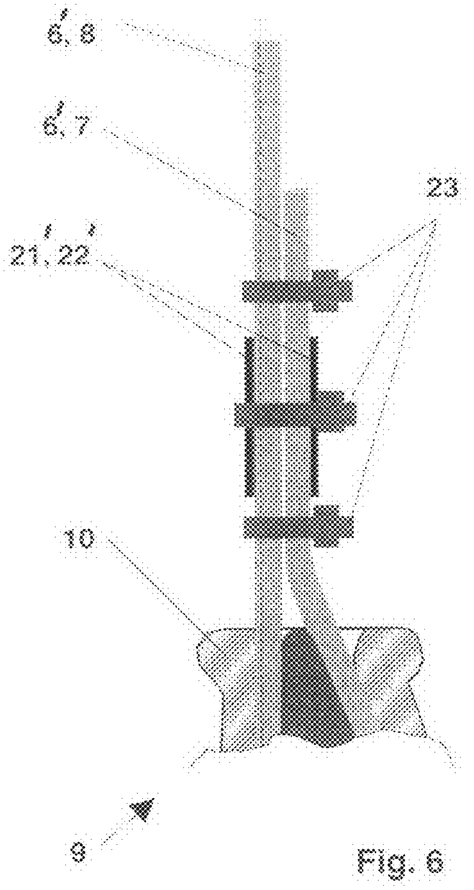
FIG. 6 is cross-sectional view of an alternative belt end fastening according to the present invention.

Alternatively, as illustrated in FIG. 6, a twisting prevention means 21' can be arranged outside the load-bearing run 8 and/or the idle run 7 of the support belt 6 utilizing two flat profile members 22'. With this embodiment, for example, retrofitting of the twisting prevention means in an existing elevator installation is possible in simple manner. Obviously, a specially shaped twisting prevention means can also embrace the support belt 6. Special adaptations to the local fastening possibilities are thus made possible.

The twisting support means 21, 21' can connect two of the support belts 6 together and/or it can connect one or more of the support belts 6 with a part of the elevator installation. The belt end connection 9 is thus connected, directly or indirectly, with at least one further belt end connection and/or with a part of the elevator installation. A direct connection can be effected in that the twisting prevention means 21, 21' is arranged at, for example, a wedge housing 10 enclosing the wedge pocket 11. An indirect connection can be effected in that the twisting prevention means 21, 21' is arranged at, for example, the support belt 6.

The connecting arrangements allow selection of the respective arrangement which is most economic and/or most space-saving. The connection of two of the support belts 6 is in that case particularly efficient, since no further parts or connecting points are needed.

In a special embodiment the twisting connection means is shaped. It thereby enables connection with a part of the elevator installation or enclosure of an elevator part, such as, for example, a beam or a guide rail 5 (FIGS. 1 and 2). An example is illustrated in FIG. 7 in which a twisting prevention means 21" in the form of a flat profile member 22" of steel sheet metal connects together two of the mounting connections 9 and thereby prevents twisting of the two belt end connections 9. The twisting prevention means 21" is in that case shaped in such a manner that it surrounds the guide rail 5.

In FIG. 8 there is illustrated a further, particularly simple twisting prevention means, which protects four of the belt end fastenings 9 against twisting. Each one of a pair of the twisting prevention means 21 connect an associated two of the belt end fastenings 9 together. The twisting prevention means 21 can indicate a problem with the belt end fastenings 9 and the support belts 6. For example, is there is unequal stress in the paired belts 6 on either side of the rail 5, the twisting prevention means 21 will be shifted from horizontal to indicate that problem.

The illustrated embodiments take into consideration the special arrangements of the elevator installation. They are particularly simple and economic, since with one of the twisting prevention means 21, 21', 21" several of the belt end fastenings 9 can be secured.

As illustrated in FIGS. 5 to 8 as advantageous solutions, a respective cable connector 23 is used for fastening the twisting prevention means 21, 21', 21". The cable connector 23 in this connection is guided through an opening in the twisting prevention means 21, 21', 21". Further cable connectors 23 are used in the illustrated embodiments in order to fix the idle run 7 of the support means 6.

The cable connectors 23 are economic components which can be produced in a simple manner. The illustrated embodiment is accordingly economic and simple to provide. In addition, the illustrated embodiment enables slight displacements between several interconnected belt end connections 9, as can result, for example, in the case of different degrees of stretching of the support belt 6.

Figure 3A:
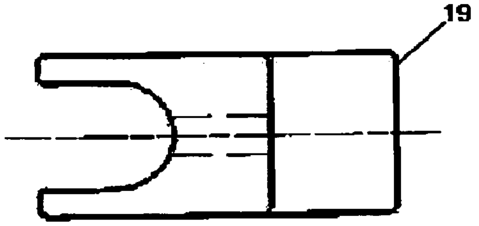
FIG. 3*a* is an enlarged bottom plan view of a loss prevention device of the belt fastening shown in FIG. 3.

According to a further part of the present invention the wedge 12, which fixes the support belt 6 in the wedge pocket 11 of the belt end connection 9, is, as shown in FIGS. 3, 3*a*, and 5, secured by way of a loss prevention device or means 19. The loss prevention means 19 is, in case of need, removable in simple manner.

The loss prevention means 19 effectively prevents the wedge 12 from being able to slip out in the case of a loose support belt 6. Loose support belts 6 can result if the car 3 or the counterweight 4 is strongly braked or is braked to a stop, which can take place in the case of, for example, a test of safety brakes or in the case of movement of the car 3 or the counterweight 4 onto travel limiting devices, for example run-up buffers. Damage to the support belt 6, or of the belt end connection 9, by displacement or jamming or slipping out of the wedge 12 is thereby effectively precluded. The illustrated loss prevention means 19 can, in addition, be mounted and demounted in simple manner.

In an advantageous embodiment the loss prevention means 19 is fastened together with a support bolt securing means 20. As the support bolt securing means 20 there is in that case used, for example, a splitpin. The support bolt securing means 20 is usually required in order to prevent the rotating out of a support bolt 17. The support bolt 17 transmits the supporting force of the support belt 6 from the wedge housing 10 to the car 3 or the counterweight 4 or the elevator shaft 2. Two requirements—prevention against slipping out of the wedge and prevention of untwisting of the support bolt—can be conjunctively fulfilled by the illustrated solution. This is particularly economic and favorable in assembly. Also, the loss prevent means 19 can be shaped for controlling the correct seat of the wedge 12 in the wedge pocket 11 as shown in FIG. 5.

The support bolt 17 is advantageously executed as a threaded bolt 18. Thus, a secure and economic introduction of the supporting forces into the elevator shaft 2, the car 3 or the counterweight 4 can be achieved.

Figure 6A:
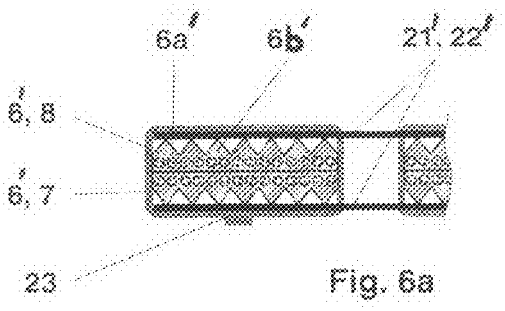
FIG. 6*a* is a cross-sectional view transverse to FIG. 6 showing a portion the support means in the region of a twisting prevention means.
Figure 5A:
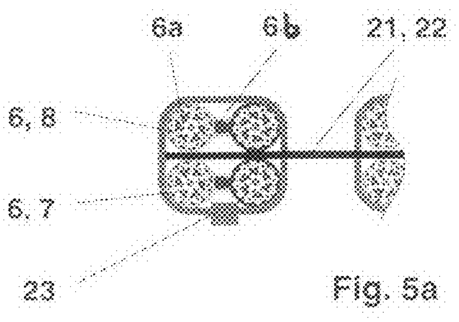
FIG. 5*a* is a cross-sectional view transverse to FIG. 5 showing a portion of the support means in the region of a twisting prevention means.

FIGS. 5*a* and 6*a* show schematic cross-sections of the support belts 6 by way of example. The support belt 6 is produced according to the load-bearing and drive capability requirements. As shown in FIG. 5*a*, the support belt 6 can consists of at least two cable bundles having multiple cable strands 6*a* arranged at a spacing relative to one another and a casing 6*b*, which separates the cable bundles 6*a* from one another and encloses them. In another variant shown in FIG. 6*a*, a support belt 6' consists of two or more cable strands 6*a*', which are arranged at a spacing from one another, and a casing 6*b*', which separates the individual cable stands 6*a*' from one another and encloses them. Essentially thermoplastic materials or elastomers are used as the casing material. A width of the corresponding support belt 6, 6' corresponds with at least twice the thickness of the belt. The casing 6*b*, 6*b*' of the support belt has a functionally appropriate shaping. It is, for example, as illustrated in FIG. 5*a* embossed in correspondence with the cable shape, whereby longitudinal grooves result, or it has, as apparent from FIG. 6*a*, a functional surface in the form of longitudinal or transverse grooves. The casing 6*b*, 6*b*' is for this purpose designed for transmission of the driving forces, which are required for driving an elevator, from a drive pulley to the supporting cable bundles or cable strands 6*a*, 6*a*' and it must, substantially within the cable end connection 9, transmit a supporting force, which acts in the support cable 6, 6', from the cable bundles or the cable strands 6*a*, 6*a*' to the belt end connection 9. The cable bundles/strands 6*a*, 6*a*' preferably are formed of metallic material, such as, for example, steel, or of synthetic material fibers.

With knowledge of the present invention the elevator expert can change the shapes and arrangements as desired. Thus, for example, the expert can use, instead of the cable connector 23, other fastenings such as a clamp or wire, etc. Further variations are possible.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. In an elevator installation including a car and a counterweight moving in opposite directions in an elevator shaft and connected together and supported by a support belt, the support belt having two ends, wherein each end is fastened by a belt end connection to one of the car, the counterweight and the elevator shaft, the belt end connection comprising:

a wedge housing including a wedge pocket for receiving a wedge and for fixing the support belt in said wedge pocket;

a support bolt disposed within said wedge housing and connecting said wedge housing to one of the car, the counterweight and the elevator shaft;

a loss prevention device preventing said wedge from slipping out of said wedge pocket, wherein the loss prevention device is removably positioned on the wedge housing and abuts the support bolt, and the loss prevention device is entirely removable from the wedge housing; and a support bolt securing means disposed through the loss prevention device, the support bolt, and the housing, the support bolt securing means securing the loss prevention device directly to the support bolt, thereby preventing all substantial relative movement of said support bolt and said wedge housing.

2. The belt end connection according to claim 1 wherein said support bolt securing means is a splitpin, said splitpin adapted to fit through and connect together said support bolt and said loss prevention device, and to attach said loss prevention device to the belt end connection.

3. The belt end connection according to claim 1 wherein said support bolt is a threaded bolt, said threaded bolt disposed in a threaded hole of said wedge housing.

4. The apparatus according to claim 1 wherein said support bolt is a threaded bolt, said threaded bolt disposed in a threaded hole of said wedge housing, and wherein said support bolt securing means is a splitpin, said sptitpin disposed through and connecting together said support bolt and said loss prevention device, and attaching said loss prevention device to the belt end connection.

5. The apparatus according to claim 1 wherein the support belt includes at least two strands spaced from one another and a casing separating said stands from one another and enclosing said strands, said casing being formed of one of a thermoplastic material and an elastomer, and wherein a width of the support belt is at least twice a thickness of the support belt.

6. A method of fastening a belt end connection in an elevator installation comprising the steps of:

a. providing a wedge housing;

b. providing a support bolt for connecting the wedge housing to one of a car, a counterweight and an elevator shaft;

c. inserting an end of the support bolt and a wedge into the wedge housing;

d. providing a loss prevention device to prevent the wedge from slipping out of the wedge housing, wherein the loss prevention device is removably positioned on the wedge housing and abuts the support bolt; and e. securing the loss prevention device and the support bolt together and to the wedge housing with a support bolt securing means disposed through the loss prevention device, the support bolt, and the housing, the support bolt securing means securing the loss prevention device directly to the support bolt, thereby preventing all substantial relative movement of said support bolt and said wedge housing.

* * * * *